Dec. 23, 1941.  W. VAN B. ROBERTS  2,267,536
OSCILLATION GENERATOR
Filed Jan. 6, 1940

INVENTOR.
WALTER VAN B. ROBERTS
BY
ATTORNEY.

Patented Dec. 23, 1941

2,267,536

UNITED STATES PATENT OFFICE 2,267,536

OSCILLATION GENERATOR

Walter van B. Roberts, Princeton, N. J., assignor to Radio Corporation of America, a corporation of Delaware Application January 6, 1940, Serial No. 312,627

9 Claims. (Cl. 250—36)

The present invention relates to oscillation generators, and particularly to a harmonic generator.

An object of the present invention is to provide an oscillator circuit having as little frequency dependence as possible upon variations of effective impedance between tube electrodes and which develops appreciable harmonic frequency output.

Another object is to provide an oscillator system having separable oscillation generation and harmonic generation producing circuits, and wherein the harmonic circuit produces a relatively large output even during the time the oscillation producing circuit is operating at such a small amplitude as not to develop any appreciable amount of harmonics in this last circuit.

A further object is to provide an oscillation generator system having an oscillation producing vacuum tube and a harmonic producing vacuum tube functioning on different portions of their grid voltage-anode current characteristics and so coupled and arranged that the harmonic producing vacuum tube passes no anode current during at least one-half of a cycle of oscillation in the oscillation producing tube, while the oscillation producing tube passes a current throughout its entire cycle of oscillation.

A more complete description follows in conjunction with a drawing, wherein:

Fig. 2 represents graphically the operation of the systems of Figs. 1 and 1a.

Figure 1:
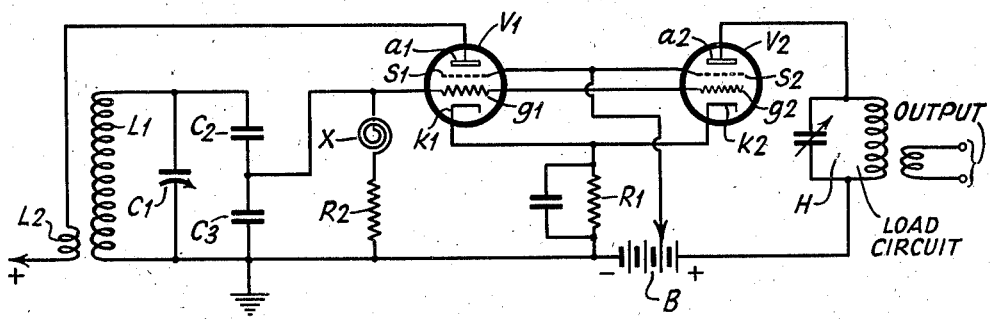
Fig. 1 illustrates one form of the present invention employing two vacuum tubes.

Referring to Fig. 1 in more detail, there is shown an oscillation generation system employing a pair of screen grid vacuum tubes $V_1$ and $V_2$, the former functioning as the oscillation producing tube while the latter acts as a harmonic generator (i. e., frequency multiplier) feeding a load H. Both vacuum tubes have their cathodes $K_1$, $K_2$, input grids $G_1$, $G_2$ and screen grids $S_1$, $S_2$ respectively connected together so as to be in parallel relation. The oscillation producing circuit comprises a vacuum tube $V_1$ and a resonant circuit including a coil $L_1$ shunted by a variable tuning condenser $C_1$. Across coil $L_1$ there is also connected the series combination of two fixed condensers $C_2$ and $C_3$. The alternating voltage developed across one of the series connected condensers ($C_3$) is impressed between grid $G_1$ and cathode $K_1$ of tube $V_1$. A battery B serves to provide suitable positive polarizing potentials to the screen grids $S_1$, $S_2$ and to the anodes $A_1$, $A_2$ of the vacuum tubes, as shown.

Between grid $G_1$ and the negative terminal of source B there is also connected a grid leak resistance $R_2$ preferably in series with a radio frequency choke coil X. Between the anode $A_1$ of tube $A_1$ and the positive terminal of source B there is connected a feed-back coil $L_2$ which is closely coupled to coil $L_1$, with such polarity as to produce regenerative feed-back. The ratio of fixed capacities $C_2$ and $C_3$ and the mutual inductance between coils $L_1$ and $L_2$ are so chosen as to provide the least coupling between the frequency determining circuit $L_1$ $C_1$ and the input and output electrodes of the tube $V_1$ that is possible while still reliably maintaining oscillations. Preferably, $C_3$ is chosen large compared to $C_2$ so that the effect of $C_3$ upon the resonant frequency is small.

Figure 2:
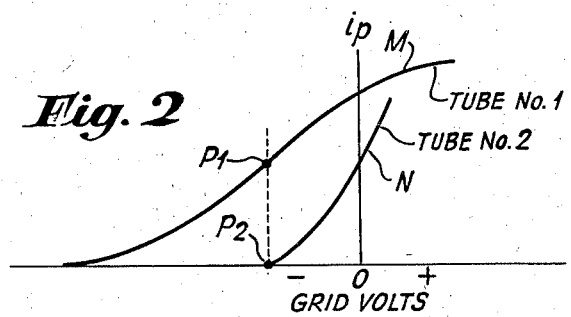

A biasing resistor $R_1$ is connected between cathode $K_1$ and the negative terminal of the source of voltage B. This resistance is shunted by a condenser for by-passing radio frequency currents and is so chosen that at the anode and screen potentials employed the resulting bias is such as to locate the operating point of the tube $V_1$ upon substantially the steepest part of its characteristic curve, as indicated by point $P_1$ of the upper curve of Fig. 2. The transconductance between grid $G_1$ and anode $A_1$ is thus at its maximum possible value for the screen and anode voltages employed. When oscillations take place, their amplitude will therefore be limited for at least one of the following two reasons: First, if the amplitude becomes large, the effective transconductance is somewhat reduced by the fact that the oscillation sweeps over the linear portion of the tube characteristic into the curved end portions; and secondly, a large amplitude will cause a flow of grid current with a consequent increase of bias which will thus reduce the effective transconductance. Since it has been assumed that the feed-back and grid excitation are made only sufficient to produce oscillations when the transconductance is substantially a maximum, it will be seen that the oscillation amplitude will limit itself to substantially the steep part of the grid voltage-anode current characteristic. The reason for taking such precautions to limit the amplitude of oscillation is that the stability of an oscillator may be shown to be the greater the larger the effective transconductance of the tube in the oscillating condition; hence, by limiting the amplitude of oscillation the effective transconductance is maintained at substantially its maximum and stability is also made as great as possible, other things being equal. On the other hand, a small amplitude of oscillation which operates over substantially only the linear part of the tube characteristic is not conducive to the production of harmonic components in the anode circuit of the tube. Thus, no considerable amount of harmonic output is obtainable by the customary simple expedient of inserting in the anode circuit a circuit resonant to the desired harmonic frequency. In accordance with the invention, however, a relatively large amount of harmonic frequency output is obtained even when the oscillation amplitude is very small by impressing a voltage derived from the oscillator circuit upon the input electrodes of the second electronic device $V_2$ which is so arranged as to pass current during only a portion of the positive half cycle of the voltage impressed thereupon.

The anode $A_2$ of tube $V_2$ is connected to one terminal of a load circuit H tuned to a desired harmonic frequency, whose other terminal is connected to the positive terminal of source B. The screen grid $S_2$ prevents any reaction of the output circuit H upon the frequency determining circuit $L_1$, $C_1$ of the oscillator $V_1$.

The manner in which the system of Fig. 1 functions will now be described. Vacuum tubes $V_1$ and $V_2$ are arranged to have similar characteristics, such that the anode current of tube $V_2$ is reduced to zero by the bias potential developed across resistor $R_1$ by the normal space current of tube $V_1$ in the absence of oscillations. To achieve this result, the grid $G_2$ has a closer pitch of winding than grid $G_1$ or is otherwise so arranged as to shut off anode current in tube $V_2$ completely upon the application thereto (i. e., to $G_2$) of the same biasing potential which adjusts the transconductance of tube $V_1$ to its maximum value. The difference in operation of the two tubes is readily seen by reference to Fig. 2, wherein the upper curve M shows the anode current of tube $V_1$ as a function of the potential difference between its input grid and cathode while the lower N curve shows the anode current of tube $V_2$ as a function of the potential difference between its input grid and cathode. In operation, the bias is so chosen that the non-oscillatory operating point of the characteristic of tube $V_1$ is at the steepest part of the curve, as indicated by the dot $P_1$ (class A operation) while the operating point for tube $V_2$ is at approximately the cut-off point of anode current, here marked $P_2$ (class B operation). With the arrangement shown in Fig. 1, the same bias potential is used for adjusting both tubes to the desired operating point. When oscillations begin, it will be seen that pulses of anode current occur in tube $V_2$ only during the positive half cycle of oscillation so that the harmonic output circuit H is efficiently energized at the harmonic frequency. As the oscillations increase in strength, the average anode curent of tube $V_2$ increases and this increases the current through bias resistor $R_1$ with the result that both operating points move slightly to the left of the points $P_1$, $P_2$. Also, if the oscillations are strong enough to overcome the bias provided by resistor $R_1$, a grid current will flow through grid leak $R_2$, thus still further increasing the bias on both tubes. However, as explained before, the oscillations will preferably reach a stable amplitude before the bias on the tubes has increased to any considerable extent.

Figure 1A:
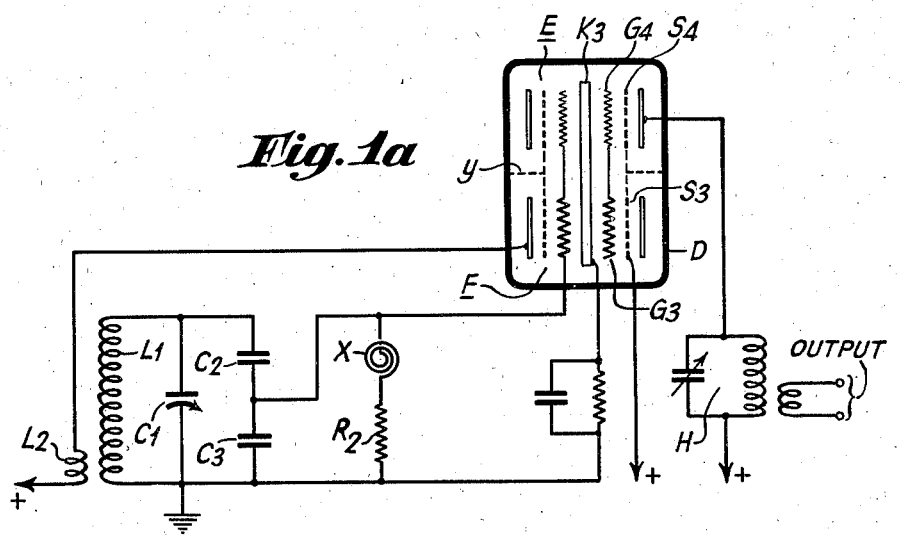
Fig. 1a illustrates a modified form of the system of Fig. 1 employing a single vacuum tube.

In practice, some difficulty might be experienced in obtaining two tubes (such as $V_1$ and $V_2$) having their electrical characteristics so perfectly related that the point of greatest transconductance of one tube falls on the same vertical line as the cut-off point of the other tube. It should be understood that the advantages of the invention are obtainable by tubes which depart slightly from this perfect relation, although it will be understood that the maximum efficiency and best results will be obtained by tubes having the optimum relations set forth above. In order to overcome any such difficulty in obtaining two tubes having the optimum relations, it is preferred that the electrode structures of the two tubes be placed within a single enevelope, the desired relations being insured during the process of manufacture. Such a preferred arrangement is illustrated in Fig. 1a, wherein two electrode structures E and F having the desired electrical characters are shown contained within a single envelope D. The structure F is the oscillating structure and corresponds to the electrode structure of tube $V_1$ in Fig. 1, while structure E is the harmonic producing structure which corresponds to the electrode structure of tube $V_2$ in Fig. 1. It should be noted that a single cathode $K_3$ extends longitudinally of the tube and symmetrically with respect to both structures, and is employed for both electrode structures E and F. The cathode $K_3$ is merely illustrative of any suitable cathode arrangement which may be employed; for example, if desired the cathodes for the structures E and F may be separate though connected together. The control grids $G_3$, $G_4$ and the screen grids $S_3$, $S_4$ of the structures E and F are shown directly connected together by short metallic connections, the screens being so disposed in the manner indicated in the drawing, to provide a metallic partition Y between the two electrode structures. The input grids $G_3$, $G_4$ of the structures E and F are shown as having different pitches of winding in order to obtain the optimum relations heretofore described, although it should be understood that these grids may have the same pitches and these relations obtained by other means, such as employing grid wires of different diameters, or using different grid-cathode spacing.

It is desired that the anode of the structure E be thoroughly shielded from both the anode and the input grid of the structure F in order that there may be no reaction whatever between the harmonic output load circuit H and the frequency determining circuit $L_1$, $C_1$ etc. For this purpose it may be desirable that the envelope D be made of metal, and the screen partitions Y so positioned that the envelope D cooperates with the screens $S_3$, $S_4$ to complete the shielding of the harmonic anode.

What is claimed is:

1. An oscillation generation system comprising a vacuum tube having a cathode, an input grid, a screen grid and an anode, a frequency determining circuit coupled between said input grid and cathode, a feed-back circuit from said anode to said frequency determining circuit, another vacuum tube having an input grid, a cathode, a screen grid and an anode, direct connections between said corresponding cathodes, input grids and screen grid electrodes, a load circuit coupled to the anode of said last tube, and means including at least one source of polarizing potential for causing said first vacuum tube to operate substantially solely on the linear portion of its input grid voltage-anode current characteristic and said second vacuum tube to operate substantially near the anode current cut-off point of its input grid voltage-anode current characteristic, whereby no harmonic output is produced by said first tube and considerable harmonic output is produced by said second tube.

2. An oscillation generation system comprising a vacuum tube having a cathode, an input grid, a screen grid, and an anode, a frequency determining circuit coupled between said input grid and cathode, a feed-back circuit from said anode to said frequency determining circuit, another vacuum tube having an input grid, a cathode, a screen grid, and an anode, direct connections between said cathodes and between said input grids, a load circuit coupled to the anode of said last tube, a bias resistor connected between said cathode connection and one terminal of said frequency determining circuit, means for applying polarizing potentials to the screen grid and anode of said first tube of such values as to locate the operating point of said first tube on the steepest part of its input grid voltage-anode current character, said feed-back circuit and the grid excitation applied to the input grid of said first tube being such that oscillations are produced therein only when the transconductance is a maximum, said second tube being so constructed and arranged that the anode current of said tube is reduced to zero by the bias potential developed across said resistor by the normal space current of the first tube in the absence of oscillations, whereby pulses of anode current flow in said second tube only during the positive half cycle of oscillation.

3. A system in accordance with claim 2, characterized in this that the electrical characteristics of said two tubes are so related that the point of greatest transconductance of said first tube occurs at the same value of input grid potential which cuts off the flow of anode current in said second tube.

4. An oscillation generation system comprising a first electrode structure having means for emitting electrons, a control grid, a screen grid and an anode, and a second electrode structure having similarly arranged electrodes, direct connections between the corresponding electron emitting means, control grid and screen grid electrodes, a frequency determining circuit coupled between the electron emitting means and control grid of said first structure, a feed-back circuit from the anode of said first structure to said frequency determining circuit, a load circuit coupled to the anode of said second electrode structure, means biasing the electrodes of said first structure such that the amplitude of oscillations are limited and are restricted to substantially the linear part of the control grid voltage-anode current characteristic, and the electrodes of said second structure such that anode current flows in said second electrode structure during only a portion of the positive half cycle of oscillation, the electrical characteristics of said structures being so related that the operating point of substantially greatest transconductance of said first structure occurs at a value of control grid potential which cuts off anode current of the other structure.

5. A system in accordance with claim 4, characterized in this that both said structures are located within a single evacuated envelope, and additional shielding means are provided for shielding the anodes of said electrode structures from each other.

6. In an oscillation generator, a tunable circuit including an inductance coil and a pair of serially connected condensers thereacross, a vacuum tube having a cathode, a control grid, a screen grid and an anode, a connection from said control grid to the junction point between said condensers, one of said condensers being of a capacity which is large compared to the other, an inductive feed-back circuit from said anode to said coil, the mutual inductance of said feed-back circuit being substantially less than said coil inductance, means for limiting the amplitude of oscillations substantially over the linear portion of the control grid voltage-anode current characteristic, another vacuum tube also having a cathode, a control grid, screen grid and anode, connections coupling together corresponding cathode, control grid and screen grid electrodes, a load circuit coupled to the anode of said last vacuum tube, said vacuum tubes having dissimilar electrical characteristics so related that the point of substantially greatest transconductance of said first tube falls substantially on the same vertical line as the anode current cut-off point of the control grid voltage-anode current curve of the second tube.

7. In a system for the production of oscillations, an oscillator electrode structure having a cathode, a control grid and an anode, a frequency determining circuit coupled with the control grid and anode to produce oscillations, a frequency multiplier structure also having a cathode, a control grid and an anode, direct connections between the corresponding cathode and control grid electrodes of said oscillator and multiplier structures, means for impressing bias on the electrodes of said two structures such that at the operating point of substantially greatest transconductance of said oscillator the anode current of said frequency multiplier is cut off, and a load circuit coupled to the anode of said frequency multiplier and tuned to a harmonic of said oscillations.

8. In a system for generating oscillations and producing harmonic oscillations thereof, a first electrode structure including cathode, grid and anode, a resonant circuit coupled to the grid and anode to produce oscillations and means for impressing bias between said grid and cathode, a second electrode structure including a cathode, grid and anode, direct connections between said grids and between said cathodes whereby identical bias and excitation are impressed between the grid and cathode of each structure at every instant, and a circuit tuned to a harmonic frequency connected between the anode and cathode of said second electrode structure, the electrodes of said structures being so constructed and energized and the bias applied to said structures being such that said structures operate on different portions of their grid voltage-anode current characteristics and the anode current of the second structure is cut off during at least a half cycle of said oscillations.

9. In a system for the production of oscillations, an oscillator electrode structure having a cathode, a control grid and an anode, a frequency determining circuit coupled with the control grid and anode to produce oscillations, a frequency multiplier structure also having a cathode, a control grid and an anode, direct connections between the corresponding cathode and control grid electrodes of said oscillator and multiplier structures, means for impressing bias on the control grids of both of said structures, said electrode structures being so constructed and energized that at the bias potential which just cuts off the flow of anode current from the second structure the transconductance of the first structure is substantially greater than zero.

WALTER van B. ROBERTS.